United States Patent
Hosoe

(10) Patent No.: US 6,766,999 B2
(45) Date of Patent: Jul. 27, 2004

(54) OPTICAL ELEMENT MOLDING DIE AND OPTICAL ELEMENT

(75) Inventor: Shigeru Hosoe, Hachioji (JP)

(73) Assignee: Konica Corporation, Tokyo (JP)

( * ) Notice: Subject to any disclaimer, the term of this patent is extended or adjusted under 35 U.S.C. 154(b) by 99 days.

(21) Appl. No.: 10/079,496

(22) Filed: Feb. 22, 2002

(65) Prior Publication Data

US 2002/0117600 A1 Aug. 29, 2002

(30) Foreign Application Priority Data

Feb. 28, 2001 (JP) .......................... 2001-054182
Sep. 28, 2001 (JP) .......................... 2001-299689

(51) Int. Cl.⁷ .............................................. B29D 11/00
(52) U.S. Cl. .................................... 249/135; 425/808
(58) Field of Search ................................ 249/135, 134; 425/808; 148/403

(56) References Cited

U.S. PATENT DOCUMENTS 4,721,518 A * 1/1988 Monji et al. .............. 65/374.11
6,521,058 B1 * 2/2003 Inoue et al. ................ 148/403

FOREIGN PATENT DOCUMENTS

JP 63-262213 * 10/1988
JP 10-217257 * 8/1998

* cited by examiner

*Primary Examiner*—James P. Mackey
*Assistant Examiner*—Donald Heckenberg
(74) *Attorney, Agent, or Firm*—Finnegan, Henderson, Farabow, Garrett & Dunner, L.L.P.

(57) ABSTRACT

A molding die for molding an optical element, comprises a die base body formed by shaping an amorphous alloy having a super-cooled liquid phase, wherein the composition of the amorphous alloy contains palladium.

3 Claims, 4 Drawing Sheets

CORRELATION OF GRAINS AND HIGH Al DENSITY PORTION

Al

- TOTAL NUMBER OF GRAINS (SEM IMAGES) : 369 PIECES
- HIGH Al DENSITY PORTION (EPMA) : 312 PIECES
- RATE OF GRAINS COINCIDING WITH HIGH Al DENSITY PORTION : 85 % (312 PIECES)
- HIGH Al DENSITY PORTION COINCIDING WITH GRAINS : 100%

OPTICAL ELEMENT MOLDING DIE AND OPTICAL ELEMENT

BACKGROUND OF THE INVENTION

The present invention relates to an optical element molding die and optical element, and particularly to a molding die for the optical element by which a desired optical surface can be easily formed, and can be used for a long period of time, and to an optical element molded by using the molding die.

A technology by which, by using an amorphous alloy having a super-cooled liquid phase (called also amorphous alloy or metallic glass), a metallic glass-made optical element molding die is formed by the heat press molding, is well known (for example, refer to Japanese Patent Application Nos. 2001-054182 and 2001-054183 which are a base of the claim of priority of the present invention by the present inventor and the patent application accompanied by the claim of priority based on them). Because such the amorphous alloy has a characteristic which is softened within the temperature range of about 300° C.–500° C., a desired shape can be comparatively easily molded by pressing, and particularly as the optical element molding material for the optical element such as a plastic lens, it can be said that it is a material having such various excellent characteristics that the hardness at the time of optical element molding is sufficiently high, and the optical surface and the dimension reference surface such as the outer periphery to be high accurately engaged with a die set can be very finely formed by the diamond cutting, or the like.

Because the ordinary metal has large crystallizing energy, when it is heated and cooled, it is crystallized, and normally, it is cooled and solidified in the polycrystal condition. In contrast to this, in the case of amorphous alloy, by quick cooling from the melt condition, the time for the crystallization is not given, and as in the atomic arrangement in the melt liquid condition, it is solidified and becomes the amorphous condition. Specifically, the composition is a polycrystal system by which many kinds of crystals are easily formed, and when it is heated and melted, the growth of the crystal nucleus is prevented by depriving each other the composition atom for its crystallization, and the critical state in which the crystal is generated, is increased, and the condition having the super-cooled liquid phase is maintained. In this condition, because each of constituent atoms is not strongly combined, it has the glass transition point, and when it is heated again, it is softened at a low temperature. However, as described above, when the crystallizing energy is not enough large, at about the temperature to be heated and softened, crystallization begins at once and it is solidified, therefore, the molding processing can not be conducted. It can be said that the amorphous alloy is made into such the composition that, by devising the composition, the crystallizing energy is increased, and the crystallization when heated and softened, is delayed as later as possible, and the super cooling liquid condition can be maintained for a long period of time.

However, even the amorphous alloy in which the crystallization is suppressed, when it is heated and softened, the higher the temperature is, or the longer the softening time is, there is the characteristic that the crystallization is easily started. Accordingly, when the processing such as press molding is conducted after the heating and softening, because the processing time is limited by the heating temperature, the longer the time to start the crystallization is, it can be said that it is the easier processable amorphous alloy.

In this connection, when the amorphous alloy is used for the optical element molding die as described in the above-described patent application, a study will be made into an amorphous alloy, the characteristic of which is more appropriate for that purpose, as follows.

The most important point in the optical element molding die is how the optical molding surface which is used for molding the optical surface of the optical element, is treated. This optical molding surface is used for the purpose that the optical material such as plastic or glass is formed into the product optical element by the injection molding or press molding. Accordingly, when considering the deterioration of the optical performance due to the disadvantages such as a shrunk deformation at the molding time of the optical element, double refraction due to the internal stress of the optical material, or eccentricity of each of molding dies, the optical molding surface of the optical element molding die is required that the allowable error is smaller than the optical surface shape of the optical element as the product, and it is nearer the ideal shape. For the shape error of the optical molding surface of the optical element molding die, in a camera-use image pick-up lens, when, generally, it is about 100–300 nm, it is enough for the purpose, however, in a pickup-use objective lens of a device such as the optical information recording and/or reproducing device, the high accuracy, which is lower than 50 nm, is required.

Further, it is preferable that the surface roughness of the optical molding surface of the optical element molding die is, at least, lower than $1/10$ of the wavelength, when possible, lower than $1/200$, so that the light does not scatter. Specifically, for the general surface roughness of the optical molding surface, in a case of a camera-use image pick-up lens for which the visible light entire range is used, it is lower than Rz 30 nm, and also in a case of a DVD-use pickup objective lens whose using wavelength is 650 nm, it is required to be lower than Rz 50 nm. Further, in a case of the optical pickup device for which a HD-DVD currently studied extensively as the optical information recording and/or reproducing device of the next generation is made the optical information recording medium, because the using wavelength $\lambda$ is 405 nm, it is preferable that the surface roughness is lower than Rz 8 nm. This is for the reason that, because $R \propto 1/\lambda^4$ (1) when the scattering of the light on the optical surface is expressed by Rayleigh scattering R, when compared with the case where a common DVD is made the optical information recording medium, equivalently the 6–7 times surface roughness is necessary. Because the scattering condition of the light depends also on the shape of the optical molding surface, these surface roughness are standard values, however, when the surface roughness of the optical molding surface of the optical element molding die exceeds these values, the stray light due to the scattering is generated, and actual damages in which the contrast of the image is lowered and the image becomes unclear, or the effective light amount for the signal processing is lowered, and the SN becomes poor, are generated.

As described above, because the optical molding surface of the optical element molding die is necessary for the vary high shape accuracy and very high flatness depending on the cases, although the forming method is by the cutting processing or molding processing, the very high easiness for being cut and fine and accurate composition structure are preferable for the metal material, and for the purpose that the condition of the optical. molding surface is maintained for a long period of time, it is preferable to have the high resistance to oxidation or hardness.

Conventionally, for example, when, by the cutting processing such as diamond machining, the optical molding surface of the optical element molding die is formed, as the molding die material by which the diffusion wear of the diamond can be suppressed, aluminum alloy or soft metal such as copper, or electroless nickel galvanizing is used. Because the optical element molding die by the soft metal has disadvantages in which, because the harness is low, the optical molding surface is easily scared, and because the resistance to oxidation is low, after cutting processing, the surface of the optical molding surface is oxidized and hazed in several weeks, it can be said that this molding die is improper for the purpose of the mass production of the optical element, but, because it is enough to mold the very small amount of optical elements in a short delivery time, it is sometimes used for such the purpose.

Actually, when the diamond machining is conducted, because the soft metal material is polycrystal structure and has the grain boundary, the hardness is microscopically different depending on the orientation of each crystal or composition, and also the surface processed by the cutting generates minute undulation (grain boundary step difference) corresponding to the hardness of the grain boundary or the elastic modulus. Therefore, as the surface roughness, even when a tool having the very sharp edge is used, about Rz 10 nm is the limit to improve the surface roughness, and there is a problem that, even when the tool edge is worn very little, the surface roughness easily exceeds Rz 20 nm. Further, in aluminum alloy, regardless of a method by which it is formed, because the material is made by the melting process from the material ore, the impurity can not be removed by any method, and specially, the retained austenite due to the impurity such as silicon has the very high hardness, and there is a problem that, when the tool edge of the diamond touches this portion, a chip is generated. Further, in the case of copper, it is necessary to use the material of the grade in which the purity is specially increased, such as oxygen free copper, and the cost is increased.

In contrast to this, in the case of the electroless nickel galvanizing, the amorphous alloy of nickel and phosphorus is formed on the molding die base material surface by the chemical galvanizing, and the optical molding surface is formed in such a manner that this galvanized surface is processed by the diamond cutting. Accordingly, because the composition is amorphous and so there is no grain boundary, when it is processed by cutting, the grain boundary step difference is not generated, however, because it is generated in the galvanizing process by the chemical reaction, the deposit of nickel phosphorus is advanced into the fine spherical shape on the base point of the reaction core, and microscopically, because it becomes the structure composed of particles in which the mol rate of the nickel phosphorus is different, and the slight difference is generated in the easiness for being cut, the very minute irregularity similar to the grain boundary step difference is generated. In FIG. 1, the result in which the surface (plane) on which the elecroless nickel galvanization is processed by diamond cutting, is observed by the inter-atomic force microscopy (AFM), is shown. The cutting flaws of the tool edge is observed in the longitudinal direction, and it can be seen that the cutting is advanced comparatively finely, but numerous granular irregular portions are observed in the connection portion of each of cutting flaws, thereby, the surface roughness is damaged. The surface roughness of this cutting surface is Rz 40.27 nm.

As described above, it is found that, in the conventional optical element molding die material, the optical molding surface roughness enough to mold the above-described high accurate optical element can not be obtained in the diamond cutting processing. Next, the case where the amorphous alloy having the super-cooled liquid phase is used for the material of optical element molding die, will be described.

As described above, the amorphous alloy has the characteristic that, because of the amorphous, the grain boundary does not exist and the easiness for being cut by the diamond cutting is excellent. When a metal is melted, because hydrogen gas is generated and porous is easily formed, the deforming agent is inserted, and the processing to be heated in the vacuum is conducted. However, at the time of heating and softening at which it is in a super cooling condition, when it touches the air, aluminum in the composition is oxidation-reacted with the air, and a hard grain is made, and there is sometimes a case in which this is generated in the whole system.

After the blank shape of the optical element molding die is heat-press molded by using amorphous alloy $Zr_{60}Cu_{30}Ni_5Al_5$, the present inventor finishes the optical molding surface by the diamond cutting, and as shown in FIG. 2, the cutting processed surface is observed by the differential interference microscope. The observation magnification is 200 times. The hard oxide grain existing like a stone in the material having a high easiness for being cut, can be seen, and the condition that the diamond tool edge hitches it and while dragging it, the cutting processing is conducted, is seen. It is seen from the direction of shadow that the grain is a convex, and it is considered that its height is very higher than the periphery. In such the condition, because there are numerous striped grooves on the cutting processed surface, the surface roughness is conspicuously deteriorated, and because the oxide grain touches the diamond tool edge, in the condition near the collision, the tool edge is easily chipped, and life of the tool is conspicuously shortened.

In FIG. 3, on the SEM (scanning type electronic microscope) photograph of the same cutting sample, the Al distribution image detected by the EPMA (Electron Probe Micro Analysis: a analysis method in which the composition atom is estimated by the characteristic X ray energy or wavelength which is generated by irradiating the electronic ray onto the sample) is superimposed, and the grains on the processed surface and Al distribution of the amorphous alloy composition almost coincide with each other (in 369 grains, 312 grains coincide with the high density position of Al), and it is seen that the alumina grain is made. In other composition elements, such the uneven distribution can not be seen. Further, as the result that the grain is examined by the X-ray diffraction, it is not crystallized. When the amorphous alloy is heat-press molded and a desired primary shape is obtained, and the surface corresponding to the optical surface of the optical element is processed by the diamond cutting, in its heat-press molding process, it can be seen that very deep attention is necessary for the oxidation of the component of the metal material.

Also when the optical molding surface is molded by the heat-press molding, when the oxide grain is made, the crystallization quickly advances by making this a core, and it is quickly solidified, and not only it can not be transferred, but also, the flatness of the optical surface of the optical element transferred by the press molding is lost by the multi-crystallization of the optical molding surface, and it becomes the hazed surface, and can not be used as the optical surface. Accordingly, also when the optical surface is formed by the heat-press molding, very deep attention is necessary for the oxidation of the component of the amorphous alloy.

SUMMARY OF THE INVENTION

The object of the present invention is, while the excellent characteristic of the amorphous alloy such as the high easiness for being cut, heat-pressing processed-ability, high hardness, and high strength, is utilized, to provide an optical element molding die which has the optical molding surface whose surface roughness is excellent, and by which the optical element can be molded high efficiently, high accurately, and at low cost, and to provide an optical element formed based on that.

An optical element molding die described in (1) is characterized in that palladium is included in the composition of the amorphous alloy having the super-cooled liquid phase.

The present inventor studies it, and as a result, comes to mind that, while the excellent characteristic as the optical element molding material of the amorphous alloy is made the best use of it, in order to obtain the amorphous alloy by which the sufficient surface roughness can be secured in the heat-press molding process which is irresistible in its use, the palladium is included in it.

The present inventor finds that, because, specially on the optical molding surface, the flatness is lost and hazing is generated by only a slight oxidation, on the optical element molding die whose specular property is important, it is very effective that palladium series amorphous alloy is used for its material. Because palladium is a precious metal main component, it is hardly oxidized, and it is very easily treated also in the heat-press molding die of the optical element, and further, it is considered that palladium hardly generates the crystalline nucleus in the alloy melting of the amorphous alloy, as a result, the crystallization of the material is hardly generated. Therefore, when it is heat-press molded in the super-cooled liquid phase, because an allowance can be obtained in the molding temperature or holding time, in the optical element molding die, it has the advantageous characteristic for the purpose to accurately mold-transfer process the optical surface. As such the palladium series amorphous alloy, for example, $Pd_{40}Cu_{30}Ni_{10}P_{20}$, $Pd_{40}Ni_{40}P_{20}$, $Zr_{70}Pd_{30}$, $Pd_{76}Cu_{17}Si_7$ are listed, but, when palladium is included, it is not limited to that.

An optical element molding die according to (2) is characterized in that, in the composition of the amorphous alloy, palladium is included in the rate of not smaller than 30 mol % and not larger than 50 mol %. In this manner, when the amorphous alloy includes palladium by 30–50 mol %, as compared to the amorphous alloy having another content, the oxidation property of the amorphous alloy can be largely improved.

An optical element molding die according to (3) is characterized in that, in the composition of the amorphous alloy, aluminum is included in the rate of not larger than 3 mol %. When the content of aluminum is smaller, even when the amorphous alloy is oxidized, because the rate at which alumina grain crystallizes, is lower on the optical molding surface, the specular condition of the optical molding surface can be maintained. It is more preferable that aluminum is not entirely included in the composition of the amorphous alloy.

In an optical element according to (4), when it is molded by using the optical element molding die according to any one of (1) to (3), the high accurate optical surface shape can be formed.

An optical element according to (5) is appropriate for the molding by using the optical element molding die when the plastic material is a raw material.

An optical element according to (6) is appropriate for the molding by using the optical element molding die when the glass material is a raw material.

It is preferable when an optical element according to (7) is a lens.

BRIEF DESCRIPTION OF THE DRAWINGS

FIG. 6 is a view in which FIG. 5 is further enlarged, and which shows the observation result by the AFM.

DETAILED DESCRIPTION OF THE PREFERRED EMBODIMENT

Figure 4:
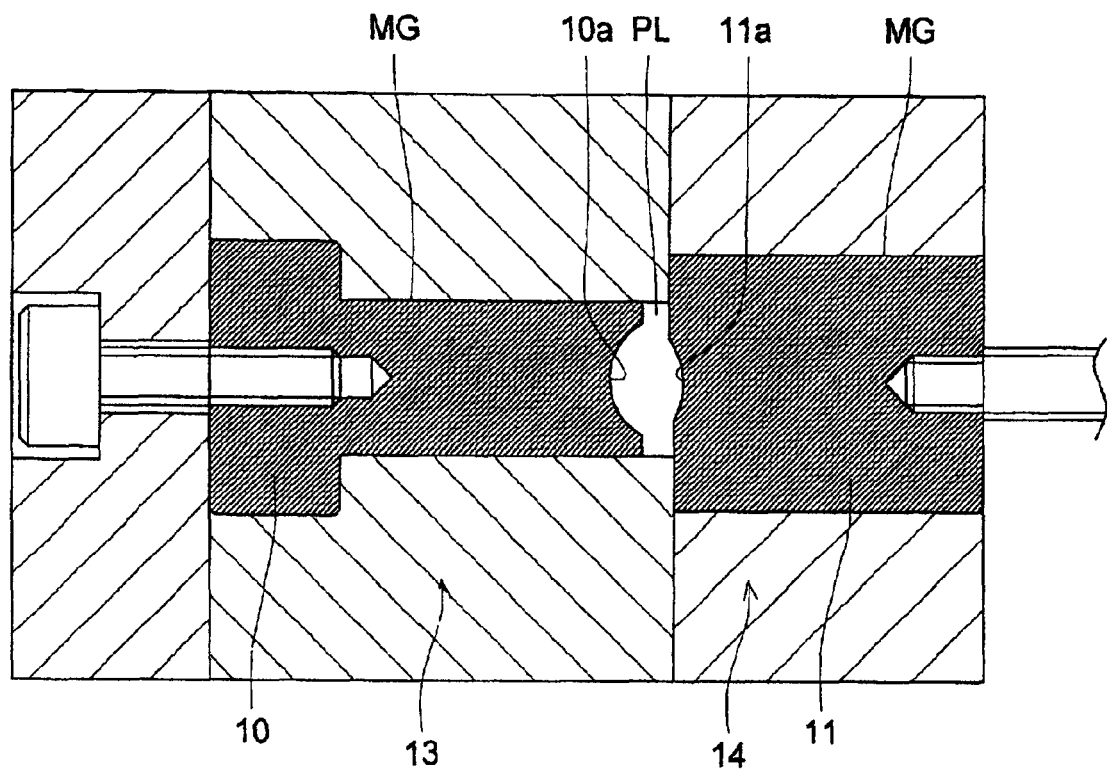
FIG. 4 is a sectional view showing an optical element molding die to mold a lens which is an optical element.

Referring to the drawings, the embodiment of the present invention will be described below. FIG. 4 is a sectional view showing an optical element molding die to mold a lens which is an optical element. For example, an optical element molding die 10 which is formed from an amorphous alloy MG and formed by conducting the mechanical processing on an optical molding surface 10a, and an optical element-use molding die 11 formed in the same manner, are inserted into die set molding dies 13 and 14 in such a manner that respectively optical molding surfaces 10a and 11a are opposite to each other, and when a melted plastic material PL is injected between the optical element-use molding dies 10 and 11, and further cooled, a desirably shaped lens can be obtained.

EXAMPLE

Figure 1:
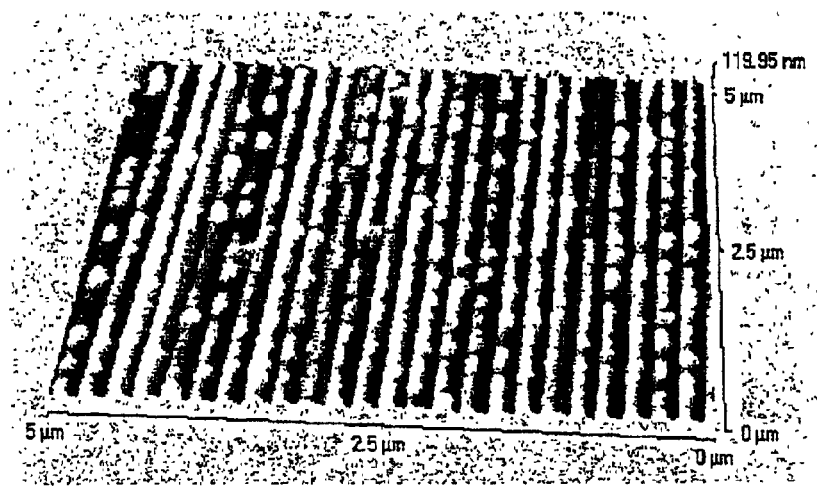
FIG. 1 is a microphotograph showing a result in which the surface (plane) on which the electroless nickel galvanizing is processed by the diamond cutting, is observed by the inter-atomic force microscope (AFM).
Figure 2:
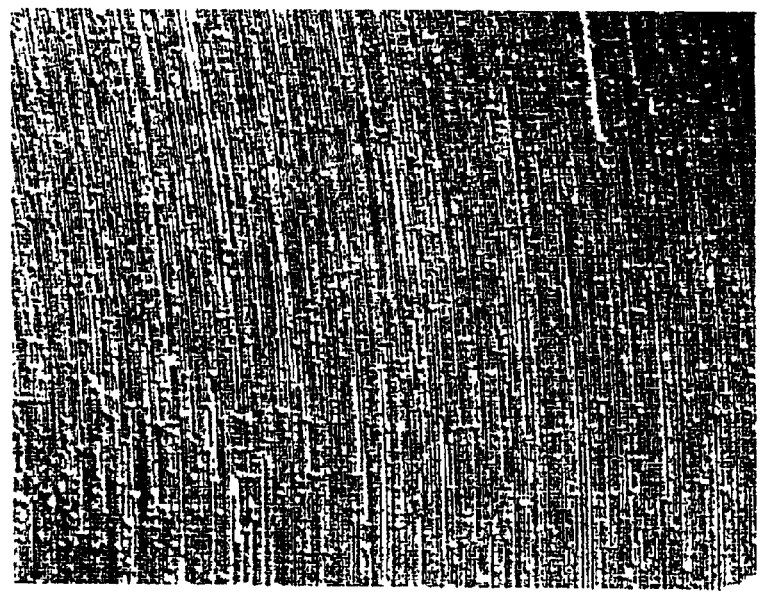
FIG. 2 is a microphotograph showing the observation result in which the amorphous alloy $Zr_{60}Cu_{30}Ni_5Al_5$ is used, and after the blank shape of the optical element molding die is heat-press molded, the optical molding surface is finished by a diamond cutting, and the work surface is observed by the differential interference microscope.
Figure 3:
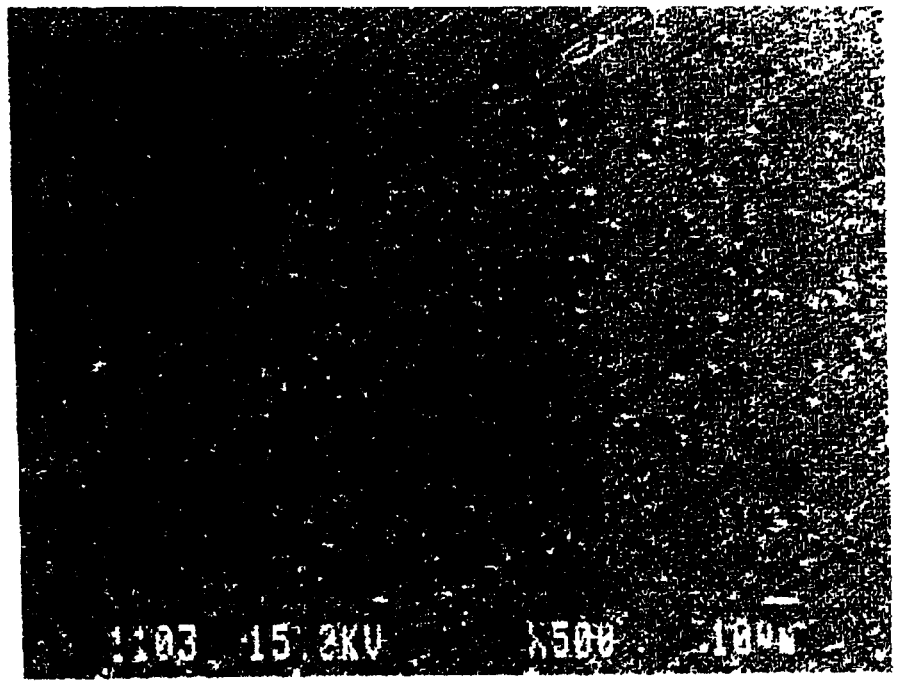
FIG. 3 is a composite image in which, on the SEM photograph of the same cutting sample of the conventional technology, the Al distribution image detected by the EPMA is superimposed, and shown.
Figure 3:
Figure 5:
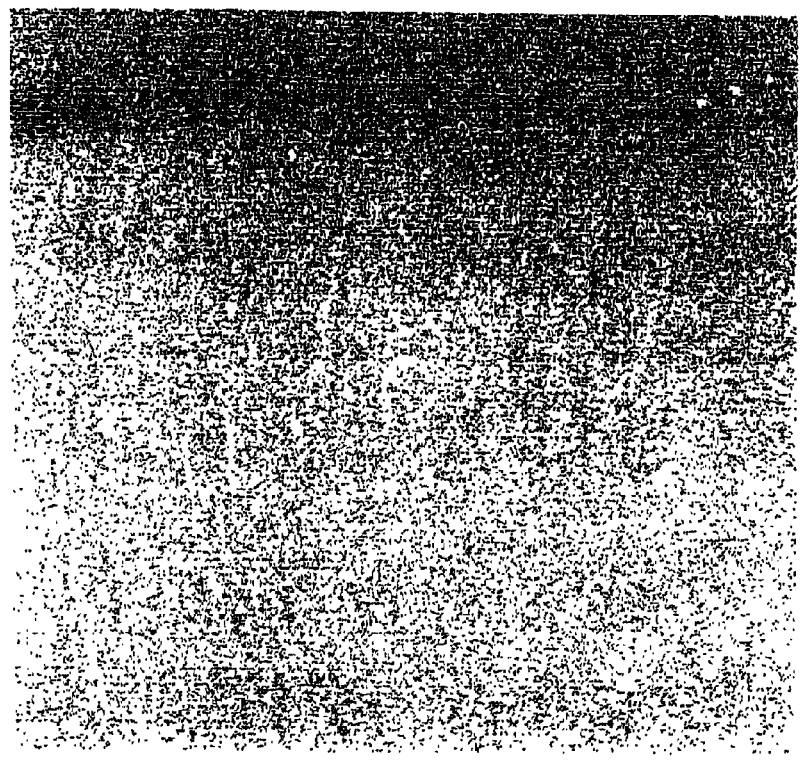
FIG. 5 is a microphotograph showing the observation result by the differential interference microscope of the surface which is diamond cutting processed, after the amorphous alloy $Pd_{40}Cu_{30}Ni_{10}P_{20}$ is heat-softened and press molded.
Figure 6:
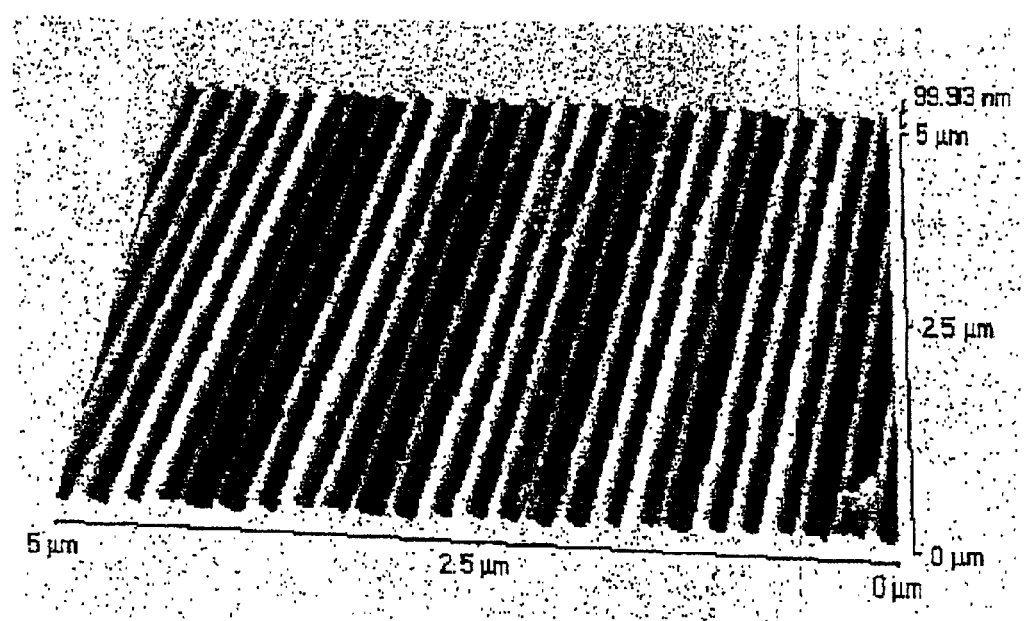

FIG. 5 shows the observation result in which, after the amorphous alloy $Pd_{40}Cu_{30}Ni_{10}P_{20}$ is heated and softened and press molded, the diamond-cut surface is observed by the differential interference microscope. When this is compared to FIG. 1 and FIG. 2 which are observation results of the conventional amorphous alloy, it is found that a very smooth and fine optical molding surface is formed. This surface roughness is Rz 2.06 nm. Herein, the surface roughness Rz means the 10 point average roughness measured according to JIS B0601 (1982). FIG. 5 is further enlarged, and the observation result by the AFM is shown in FIG. 6, and as clearly be seen from this, the granular structure is not entirely seen. Accordingly, it is found that, even when the palladium series metallic material is heat-press molded, the oxide grain is not generated, and in the molding of the molding die optical surface transfer surface and the formation by the diamond cutting, very fine surface property can be easily obtained. Also when the content of the structural composition (Pu, Cu, Ni, P) of the amorphous alloy which is the material of the optical element molding die is appropriately changed, except the case in which the improvement of the oxidation property is conspicuously seen in the range of the content of Pd 30–50 mol %, the same effect is obtained. Further, also when the structural component except Pd is increased or reduced, or changed, the same result as those is obtained. Further, when the optical molding surface is formed by the amorphous alloy in which the content of aluminum is suppressed to lower than 3 mol %, it is confirmed that the granular structure can be conspicuously reduced.

According to the present invention, while the excellent characteristic of the amorphous alloy such as the high easiness for being cut, heat-pressing processed-ability, high hardness, and high strength, is utilized, an optical element molding die which has the optical molding surface whose surface roughness is excellent, and by which the optical element can be molded high efficiently, high accurately, and at low cost, and an optical element formed based on that, can be provided.

What is claimed is:

1. A molding die for molding an optical element, comprising:

a die base body formed by shaping an amorphous alloy having a super-cooled liquid phase, wherein the composition of the amorphous alloy contains palladium with a rate of 30 mol % to 50 mol %.

2. A molding die for molding an optical element, comprising:

a die base formed by shaping an amorphous alloy having a super-cooled liquid phase, wherein the composition of the amorphous alloy contains palladium and, wherein the composition of the amorphous alloy contains aluminum with a rate of 3 mol % or less.

3. The molding die of claim 1, wherein the composition of the amorphous alloy contains aluminum with a rate of 3 mol % or less.

* * * * *